United States Patent Office 3,148,923
Patented Sept. 15, 1964

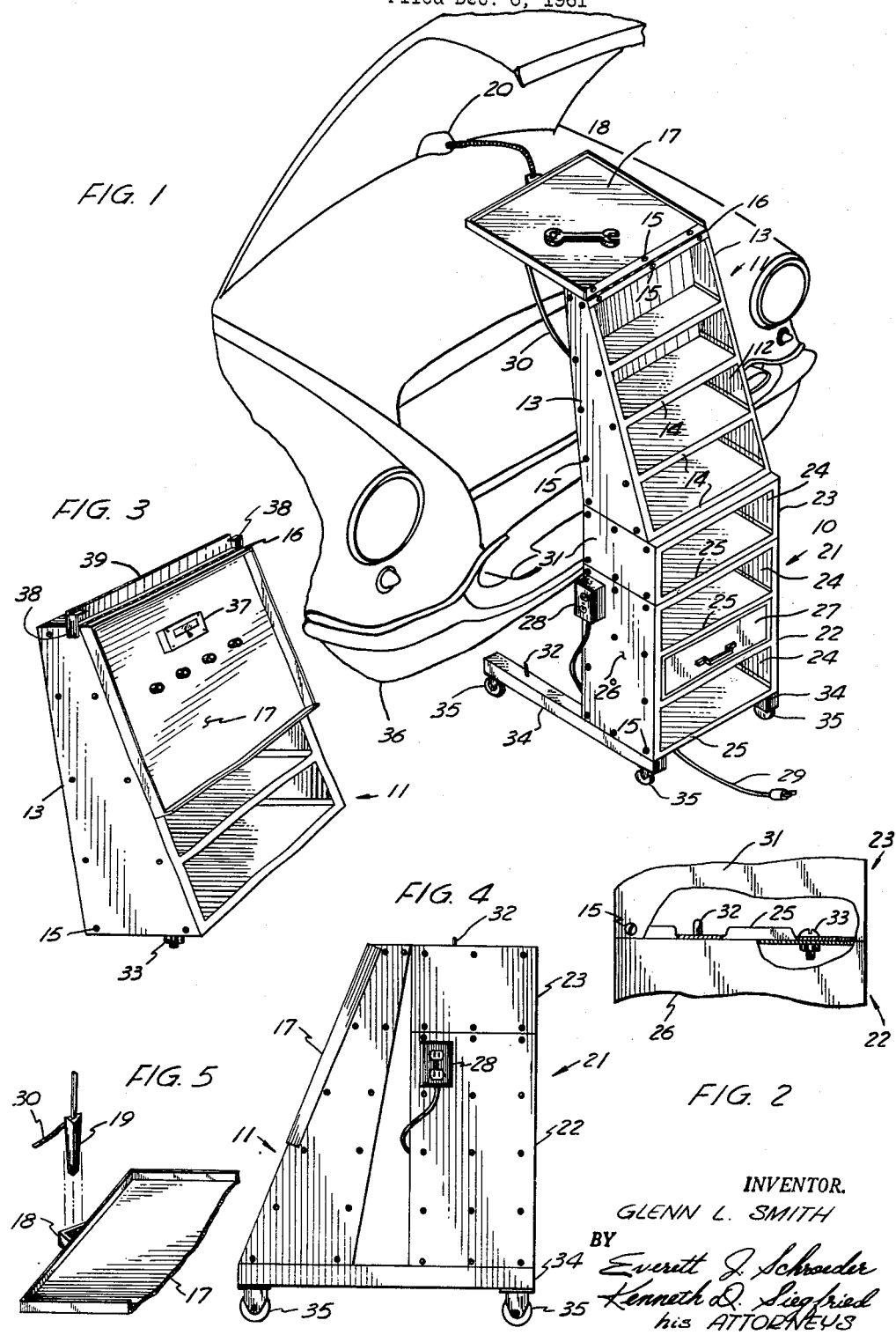

3,148,923
PORTABLE COMBINED TOOL KIT AND
WORK BENCH
Glenn L. Smith, Box 36, Bode, Iowa
Filed Dec. 6, 1961, Ser. No. 157,344
3 Claims. (Cl. 312—201)

This invention relates to the field of tool and instrument storage cabinets and particularly to a portable combined tool kit and work bench.

Numerous types of tool and instrument storage cabinets have been made available to the mechanic who is regularly engaged in overhauling engines and other such mechanical apparatus usually found on vehicles such as cars, trucks, tractors, etc. However, most of the cabinets are so designed that they are quite cumbersome to move from one location to another and in general are designed to be located in a fixed area with respect to other tools and work benches. For those tool cabinets which were designed to be portable, the desirable feature of having the work bench adjacent the work area was not to be found. Furthermore, tool cabinets of this type were not truly portable units in that they could be transported from one location to another by placing them in the trunk of a car or station wagon or the like. For the most part, the tool cabinets formed only tool or instrument storage areas and did not provide the combined features of storing the tools, equipment, and instruments as well as providing a work bench, all of which could be moved about into the general work area of the particular vehicle or piece of machinery being constructed or repaired. It is also desirable at times to have a portable tool kit and work bench which can be moved under a hydraulic hoist while working upon certain types of vehicles.

In my invention, a portable combined tool kit and work bench store all the small tools that are generally used by the average mechanic while working upon an automobile engine or some other device such as the speedometer or electrical assembly of the car. A mechanic working upon the specific part of the automobile to be repaired, has all his tools at hand and in general, in the work area adjacent the part to be repaired or adjusted. Furthermore, none of the tools are brought in contact with the automobile to mar the finish of the automobile or dirty the interior. Furthermore, when my combined tool kit and work bench are moved under an automobile that is on a hoist and raised overhead, a light may be affixed to the work bench or work area to illuminate the portion of the automobile requiring the repair and yet all of the tools are at the finger-tips of the mechanic.

My portable combined tool kit and work bench is generally of such size that when the top section is removed and placed behind the lower section, it will easily fit into the average trunk of an automobile for moving it from one location to another.

Briefly stated, my portable combined tool kit and work bench has an upper storage section for storing tools and small parts which generally consists of a series of shelves or drawers or a combination of shelves and drawers. For some embodiments, the upper portion is sloped rearwardly so that the shelves within the upper section appear much like a staircase and provide easy access to the contents as well as providing a good view of the contents within the storage compartments. The upper section is placed over a lower section which may be interchanged with other sections to provide a desirable height or may have additional lower sections added to a primary lower section to provide the work bench at a predetermined height. These units are supported by a base which consists of a pair of horizontal supporting legs which are generally mounted on casters to insure that the tool kit may be moved about and also the legs are generally spaced far enough apart so that they will straddle a tire of an automobile. In this position, the cover which normally folds over the front of the upper storage section when the tool kit is not in use, is extended outwardly and rearwardly to be positioned over the engine compartment of an automobile or in other instances may be extended through the door of an automobile to work on the body interior.

It is therefore a general object of my invention to provide a new and improved portable tool kit and work bench to be used with power driven vehicles.

It is yet another object of the present invention to provide a novel and improved portable tool kit and work bench where the upper portion of the tool kit is easily removed for ease in transporting the tool kit from one location to another.

It is still another object of my invention to provide a novel and improved portable combined tool kit and work bench having the upper portions sloping rearwardly toward the work area.

It is yet another object of the present invention to provide a new and improved tool kit having a cover which serves as a work bench in one position and covers the front of the upper portion of the tool kit in the other position.

It is yet another object of the present invention to provide a new and improved tool kit having a cover which when moved from a first position to a second position maintains one surface facing outwardly at all times.

It is still another object of my invention to provide a new and improved tool kit in which the cover has depending sides to form a tray like work bench for holding tools, instruments, and small parts.

It is still a further object of my invention to provide new and improved portable tool kit means with a cover used as a work bench when extended in one position, the work bench including means for mounting an electrical lamp.

These and other objects and advantages of my invention will more fully appear from the following description, made in connection with the accompanying drawings, wherein like reference characters refer to the same or similar parts throughout the several views, and in which:

FIG. 1 shows the portable combined tool kit and work bench in an operative position for use while working on the engine or some other part under the hood of a car;

FIG. 2 is a broken-away section of the side panels of the lower portion of the tool kit showing means for fastening the sections together;

FIG. 3 is another embodiment of my invention for use in replacing the upper section of the tool kit when used with some form of electrical instrument;

FIG. 4 is a side view of the tool kit with the cover over the upper portion of the tool kit, the upper portion being removed and set behind the lower portion for transporting; and FIG. 5 is a partial view of the work bench or cover in its extended position showing the bracket for mounting the lamp.

A tool kit 10 is made up of an upper portion forming a tool chest 11 which contains a plurality of tool compartments 12. The tool compartments have a pair of side panels 13 to which are connected a plurality of shelves 14 to form compartments 12, and shelves 14 are fastened by suitable means such as rivets, screws, or bolts 15. Wherever a shelf 14 is used, the front edge of the shelf is turned upward to form a lip and keep the tools or instruments within the compartments 12. Located at the top of tool chest 11 and at the upper front edge is a rotatable supporting element such as a piano hinge which is suitably fastened to tool chest 11 by rivets or screws 15 and the other portion of hinge 16 is connected to a cover 17 at a side or edge of cover 17 where an extending portion of cover 17 is extended upwardly. In like manner, hinge 16 is fastened by suitable screws or rivets 15 to the depending portion of the cover. Situated at the edge of cover 17 which is extended the furthest distance from side panels 13 is a bracket 18 formed in triangular shape and having a hollow triangular portion therein to which is fitted a smaller triangular member 19 which may be of a wedge shaped configuration to fit within the triangular portion and thus form a tight supporting member. Fastened to member 19 is a lamp 20 which is supported by a flexible neck so that the lamp may be used to provide light in varying directions. When cover 17 is closed, the depending edges face downwardly and the cover overlies the tool compartments 12 to cover the compartments and prevent any tools or instruments from being removed or becoming damaged. It will be noted that due to the tapering side panels 13 and the rearward sloping direction in which they extend, that the compartments or shelves are superimposed and rearwardly offset over each other. It will of course be understood that drawers may be substituted in compartments 12 if so desired.

A tool box 21 forms a lower portion of tool kit 10 and is made up of a pair of sections 22 and 23. Section 22 is the lowermost section and contains a plurality of compartments 24 which have a plurality of shelves 25 forming the floor of the compartment and attached to a pair of side panels 26, the shelves being attached by suitable means such as screws or rivets 15. Compartments 24 may also contain a drawer 27 or in fact may contain a plurality of drawers. Fastened to the lower tool box section 22 is a double receptacle plug 28 to which is connected a power cord 29 and to which is also connected a lamp cord 30 which is used to supply voltage to lamp 20. An upper portion of tool box 21, designated as numeral 23, also contains a compartment 24 which has formed at its lowermost edge a shelf 25 such as previously described. Shelf 25 is connected to a pair of side panels 31 which are similar to side panels 26 but are shorter in height. As it will be pointed out more fully later, the upper section 23 of the tool box 21 may be made in varying heights and connected with the lower portion 22 to change the height of the tool box 21 and thereby change the operating height of work bench or cover 17.

FIG. 2 shows, in detail, the method of fastening the upper section 23 to the lower section 22 of tool box 21. It will be seen that a pin 32 is projected upwardly through shelf 25 through a hole (not shown) to guide and support that portion of shelf 25 and located at the forward or front portion of the compartments 24 is a machine screw 33 which passes through shelf 25 and the upper portion of tool box section 22 to fasten the two sections together. In like manner, the tool chest 11 is fastened to the upper section 23 of tool box 21.

Located underneath tool box section 22 is a pair of horizontal supporting legs 34 which form a base for the tool kit 10 and they are fixedly fastened to lower section 22 of tool box 21. Located rearwardly from tool box 21 are a pair of pins 32 (one not being shown) which are constructed and arranged to engage a hole formed in the tool chest bottom and the hole may actually be in side panels 13 or shelves 14 depending upon the type of construction. Their use will be more fully explained later. Found under the front and rearward edge of horizontal supporting legs 34 are a plurality of casters 35 which are used to rotatably support tool kit 10 so that it may be readily moved about from one area to another. As shown in FIG. 1, tool kit 10 is positioned over the motor compartment of a vehicle 36 so that cover 17 when extended in the position shown forms a work bench over the engine compartment and under the hood of automobile 36.

In order to transport my portable combined tool kit and work bench, tool chest 11 with cover 17 overlying and covering the front of compartments 12 is removed from the upper portion of tool box 21 and is rotated 180° and placed behind tool box 21 upon horizontal supporting legs 34 such as shown in FIG. 4. Supporting legs 34 are generally equal in length to twice the width of tool box 21 or the combined widths of tool box 21 and tool chest 11. It will be seen that when tool chest 11 is placed in the position as shown in FIG. 4, that pin 32 is engaged by the hole in the bottom of tool chest 11 to keep the tool chest from sliding rearwardly and since the combined heights of tool chest 11 and tool box 21 are now approximately one-half of what they were before, transportation of the combined tool kit and work bench may be accomplished more readily.

For certain embodiments of my invention, it may be more advantageous to allow cover 17 to serve as a work bench and cover for tool chest 11 but have a cover which does not have to be inverted while being moved from a first position to a second position. A general use of this type of cover would be employed where electrical instruments such as a meter 37 which is attached to cover 17 would be employed for certain testing functions of the electrical system of the vehicle and for this type of instrument, it may be highly desirable to leave it attached to cover 17 but not have to invert the instrument while cover 17 is serving as a work bench or is covering the compartments 12. To provide such a cover and work bench, a pair of supporting elements in the form of a pair of brackets 38 are provided which are attached to the side panels 13 by suitable means such as screws or bolts at the upper and forward or front edge of side panels 13. These brackets are bent or formed in an L shape and have portions that extend over the top of tool chest 11. Instead of fastening hinge 16 to tool chest 11, it is fastened to a right angle channel 39 so that when cover 17 is extended over the forward or front side of tool chest 11, brackets 38 engage channel 39 to support and hold the cover in place at the upper edge of tool chest 11. The extending portions of cover 17 are much like those shown in FIGS. 1 and 5. However, for this particular embodiment the edge or side which is shown in the lowermost position of FIG. 3 may be slightly higher in height to engage brackets 38 as cover 17 is moved upward and rearwardly to form a work bench to be used with instrument 37.

As just described, it will be seen that I have provided a new and improved portable combined tool kit and work bench for general use with automobiles and other vehicles. It will also be seen that my combined tool kit and work bench may be readily adjustable to the optimum working height by adding the proper sections to the tool box and that by sloping the tool chest with its compartments therein, that accessibility to the tools is increased as well as extending the work bench into the work area. Furthermore, by being able to remove the tool chest 11 from the top of tool box 21 and placing it behind tool box 21 on supporting members 34, the entire unit becomes readily portable. For the uses where it is not desirable to pivot or rotate cover 17 to form the work bench, I have provided an embodiment wherein the cover may be slidably moved from a first position to a second position to form a work bench in one area and the cover for my tool chest in the other position. From the foregoing description and drawings, it will be seen that I have provided a tool kit which will achieve the stated objects of my invention.

It will, of course, be understood that various changes may be made in the form, details, arrangement and proportions of the parts without departing from the scope of my invention which consists of the matter shown and described herein and set forth in the appended claims.

I claim:

1. A portable combined tool kit and work bench comprising: a tool box having a plurality of drawers and shelves superimposed over each other for containing tools therewithin accessible through a front side thereof; a pair of horizontal supporting legs extending rearwardly from the front of said tool box, said legs being fastened to, and supporting said tool box; an upper tool chest constructed and arranged to be removed from the top of, and located behind, said tool box when supported by said pair of horizontal supporting legs, said upper tool chest having a plurality of tool compartments superimposed over each other, and having accessibility to tools therewithin through a front side thereof, said upper tool chest being releasably fastened to the top of said tool box and including side panels which are sloped rearwardly; and a cover rotatably fastened to the upper front edge of said upper tool chest overlying and covering the front side of said tool compartments in a first position and overlying the top portion of said upper tool chest in a second position thereby providing a work bench and tool support.

2. The invention as set forth in claim 1 including a bracket attached to said cover for releasably supporting an electrical lamp assembly; and a plurality of two part releasable fasteners, one part being connected to the bottom of said upper tool chest and the other part being located and attached to the top of said tool box and to the top of said horizontal supprting legs behind said tool box to aid in holding said tool chest on top of said tool box in a first location and to aid in holding said tool chest behind said tool box on said supporting legs in a second location.

3. A portable combined tool kit and work bench comprising: a tool box having a lower portion including a plurality of tool compartments superimposed over each other, each of said compartments offering accessibility to tools therewithin through a front side of said compartments, and an upper portion including a plurality of tool compartments superimposed and rearwardly offset over each other, each of said compartments offering accessibility to tools therewithin through a front side thereof, said upper portion being fastened to the top of said lower portion; a movable and slidable cover for overlying and covering the front side of said tool compartments of said upper tool chest in a first position and for overlying the top portion of said upper tool chest in a second position, said cover being movable between said first and second position without being inverted thereby providing a work bench and tool support; and supporting elements attached to said tool box at the top thereof in a forward and uppermost location, said supporting elements being constructed and arranged to guide and hold said movable cover when being moved between said first and second positions.

References Cited in the file of this patent

UNITED STATES PATENTS

| | | |
|---|---|---|
| 272,776 | Ross | Feb. 20, 1883 |
| 446,647 | Rankin | Feb. 17, 1891 |
| 521,873 | Andrus | June 26, 1894 |
| 1,940,259 | Lindemann | Dec. 19, 1933 |
| 2,151,259 | Young | Mar. 21, 1939 |
| 2,432,379 | Butler | Dec. 9, 1947 |
| 2,622,952 | Wilhide | Dec. 23, 1952 |
| 2,666,679 | Olofsson | Jan. 19, 1954 |

FOREIGN PATENTS

| | | |
|---|---|---|
| 719,106 | Germany | Mar. 30, 1942 |
| 851,123 | Germany | Oct. 2, 1952 |